(12) United States Patent
Sakamoto (10) Patent No.: US 8,979,280 B2
(45) Date of Patent: Mar. 17, 2015

(54) LIGHT SOURCE LAMP LIGHTING DEVICE AND METHOD

(75) Inventor: Kazuaki Sakamoto, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 209 days.

(21) Appl. No.: 13/817,423

(22) PCT Filed: Sep. 1, 2010

(86) PCT No.: PCT/JP2010/064874
§ 371 (c)(1),
(2), (4) Date: Feb. 15, 2013

(87) PCT Pub. No.: WO2012/029139
PCT Pub. Date: Mar. 8, 2012

(65) Prior Publication Data
US 2013/0148085 A1    Jun. 13, 2013

(51) Int. Cl.
G03B 21/16    (2006.01)
H01J 61/52    (2006.01)
(Continued)

(52) U.S. Cl.
CPC .............. H01J 61/52 (2013.01); G03B 21/16 (2013.01); G03B 21/206 (2013.01); H05B 41/2925 (2013.01)
USPC ............... 353/85; 353/52; 353/121; 362/264; 362/294

(58) Field of Classification Search
USPC ......... 353/52, 57, 85; 362/264, 294; 315/291, 315/302
See application file for complete search history.

(56) References Cited

U.S. PATENT DOCUMENTS 6,713,973 B2 * 3/2004 Erhardt .................. 315/291
7,448,759 B2 * 11/2008 Fukano ................... 353/85
(Continued)

FOREIGN PATENT DOCUMENTS

CN    1577064 A    2/2005
CN    100403160 C    7/2008
(Continued)

OTHER PUBLICATIONS

International Search Report (ISR) (PCT Form PCT/ISA/210), in PCT/JP2010/064874, Dec. 7, 2010.
(Continued)

Primary Examiner — William C Dowling
(74) Attorney, Agent, or Firm — McGinn IP Law Group, PLLC (57) ABSTRACT

A light source lamp lighting device includes a light source lamp, cooling means for cooling the light source lamp, an extinguishing time measurer that calculates extinguishing time information indicating an extinguishing period when the light source lamp was last switched off to a present time, a storage that stores lighting performance, which is a history of successes and failures of lighting the light source lamp, a plurality of cooling times corresponding to an extinguishing period when the light source lamp is switched off indicated by the extinguishing time information as a cooling time for causing the cooling means to operate, and a first threshold set with respect to the lighting performance, and a controller that reads out, in lighting the light source lamp, the lighting performance, the cooling time stored in the storage based on the extinguishing period when the light source lamp is switched off calculated by the extinguishing time measurer, and the first threshold and, when a number of successes of lighting indicated by the lighting performance exceeds the first threshold, subtracts a predetermined time from the read-out cooling time to calculate a cooling time value for causing the cooling means to operate.

12 Claims, 7 Drawing Sheets

(51) Int. Cl.
  *G03B 21/20* (2006.01)
  *H05B 41/292* (2006.01)

(56) References Cited

U.S. PATENT DOCUMENTS

| | | | |
|---|---|---|---|
| 7,737,387 B2 * | 6/2010 | Hsu | 250/205 |
| 8,425,053 B2 * | 4/2013 | Kimura | 353/85 |
| 8,777,423 B2 * | 7/2014 | Okada | 353/85 |
| 2004/0212787 A1 | 10/2004 | Kida et al. | |
| 2007/0046904 A1 * | 3/2007 | Rudolph et al. | 353/85 |

FOREIGN PATENT DOCUMENTS

| | | |
|---|---|---|
| JP | 2001-356417 A | 12/2001 |
| JP | 2004-163686 A | 6/2004 |
| JP | 2004-348109 A | 12/2004 |
| JP | 3792641 B | 7/2006 |

OTHER PUBLICATIONS

Chinese Office Action dated Aug. 15, 2014 with an English translation thereof.

* cited by examiner

| | |
|---|---|
| FIRST TIME THRESHOLD : TOFF_1 | (180 SECONDS) |
| SECOND TIME THRESHOLD : TOFF_2 | (360 SECONDS) |
| THIRD TIME THRESHOLD : TOFF_3 | (600 SECONDS) |
| COOLING TIME BEFORE RELIGHTING : TCOOL | (20 SECONDS) |
| NUMBER OF RETRY TIMES : CRETMAX | (3 TIMES) |

201

(b)

| | COOLING TIME MINIMUM VALUE TPCMIN_n | COOLING TIME INITIAL VALUE TPCTYP_n | COOLING TIME MAXIMUM VALUE TPCMAX_n |
|---|---|---|---|
| FIRST RANGE (0~TOFF_1) | TPCMIN_1 (70 SECONDS) | TPCTYP_1 (90 SECONDS) | TPCMAX_1 (110 SECONDS) |
| SECOND RANGE (TOFF_1~TOFF_2) | TPCMIN_2 (45 SECONDS) | TPCTYP_2 (60 SECONDS) | TPCMAX_2 (80 SECONDS) |
| THIRD RANGE (TOFF_2~TOFF_3) | TPCMIN_3 (20 SECONDS) | TPCTYP_3 (30 SECONDS) | TPCMAX_3 (45 SECONDS) |

202

(c)

| | REDUCTION TIME TPCDEC_n | REDUCTION CONDITION CNTDEC_n | EXTENSION TIME TPCINC_n | EXTENSION CONDITION CNTING_n |
|---|---|---|---|---|
| FIRST RANGE (0~TOFF_1) | TPCDEC_1 (5 SECONDS) | CNTDEC_1 (5 TIMES) | TPCINC_1 (5 SECONDS) | CNTING_1 (2 TIMES) |
| SECOND RANGE (TOFF_1~TOFF_2) | TPCDEC_2 (5 SECONDS) | CNTDEC_2 (5 TIMES) | TPCINC_2 (5 SECONDS) | CNTING_2 (2 TIMES) |
| THIRD RANGE (TOFF_2~TOFF_3) | TPCDEC_3 (5 SECONDS) | CNTDEC_3 (5 TIMES) | TPCINC_3 (5 SECONDS) | CNTING_3 (2 TIMES) |

203

(d)

| | COOLING TIME VALUE Tpc_n | SUCCESS COUNT VALUE Cntok_1 | FAILURE COUNT VALUE Cntng_1 |
|---|---|---|---|
| FIRST RANGE (0~TOFF_1) | Tpc_1 (TPCTYP_1) | Cntok_1 (0) | Cntng_1 (0) |
| SECOND RANGE (TOFF_1~TOFF_2) | Tpc_2 (TPCTYP_2) | Cntok_2 (0) | Cntng_2 (0) |
| THIRD RANGE (TOFF_2~TOFF_3) | Tpc_3 (TPCTYP_3) | Cntok_3 (0) | Cntng_3 (0) |

204

(e)

| | MINIMUM COOLING TIME VARIABLE Thmin_n | MAXIMUM COOLING TIME VARIABLE Thmax_n |
|---|---|---|
| FIRST RANGE (0~TOFF_1) | Thmin_1 (TPCMIN_1) | Thmax_1 (TPCMAX_1) |
| SECOND RANGE (TOFF_1~TOFF_2) | Thmin_2 (TPCMIN_2) | Thmax_2 (TPCMAX_2) |
| THIRD RANGE (TOFF_2~TOFF_3) | Thmin_3 (TPCMIN_3) | Thmax_3 (TPCMAX_3) |

| CUMULATIVE LIGHTING TIME 0~1000HOURS | COOLING TIME MINIMUM VALUE TPCMIN_n | COOLING TIME INITIAL VALUE TPCTYP_n | COOLING TIME MAXIMUM VALUE TPCMAX_n |
|---|---|---|---|
| FIRST RANGE (0~TOFF_1) | TPCMIN_1 (60 SECONDS) | TPCTYP_1 (80 SECONDS) | TPCMAX_1 (100 SECONDS) |
| SECOND RANGE (TOFF_1~TOFF_2) | TPCMIN_2 (35 SECONDS) | TPCTYP_2 (50 SECONDS) | TPCMAX_2 (70 SECONDS) |
| THIRD RANGE (TOFF_2~TOFF_3) | TPCMIN_3 (20 SECONDS) | TPCTYP_3 (30 SECONDS) | TPCMAX_3 (45 SECONDS) |

(b)

| CUMULATIVE LIGHTING TIME 1000~2000 HOURS | COOLING TIME MINIMUM VALUE TPCMIN_n | COOLING TIME INITIAL VALUE TPCTYP_n | COOLING TIME MAXIMUM VALUE TPCMAX_n |
|---|---|---|---|
| FIRST RANGE (0~TOFF_1) | TPCMIN_1 (70 SECONDS) | TPCTYP_1 (90 SECONDS) | TPCMAX_1 (110 SECONDS) |
| SECOND RANGE (TOFF_1~TOFF_2) | TPCMIN_2 (45 SECONDS) | TPCTYP_2 (60 SECONDS) | TPCMAX_2 (80 SECONDS) |
| THIRD RANGE (TOFF_2~TOFF_3) | TPCMIN_3 (20 SECONDS) | TPCTYP_3 (30 SECONDS) | TPCMAX_3 (45 SECONDS) |

(c)

| CUMULATIVE LIGHTING TIME 2000~3000 HOURS | COOLING TIME MINIMUM VALUE TPCMIN_n | COOLING TIME INITIAL VALUE TPCTYP_n | COOLING TIME MAXIMUM VALUE TPCMAX_n |
|---|---|---|---|
| FIRST RANGE (0~TOFF_1) | TPCMIN_1 (70 SECONDS) | TPCTYP_1 (100 SECONDS) | TPCMAX_1 (120 SECONDS) |
| SECOND RANGE (TOFF_1~TOFF_2) | TPCMIN_2 (45 SECONDS) | TPCTYP_2 (70 SECONDS) | TPCMAX_2 (90 SECONDS) |
| THIRD RANGE (TOFF_2~TOFF_3) | TPCMIN_3 (20 SECONDS) | TPCTYP_3 (40 SECONDS) | TPCMAX_3 (55 SECONDS) |

(d)

| CUMULATIVE LIGHTING TIME 3000 HOURS~ | COOLING TIME MINIMUM VALUE TPCMIN_n | COOLING TIME INITIAL VALUE TPCTYP_n | COOLING TIME MAXIMUM VALUE TPCMAX_n |
|---|---|---|---|
| FIRST RANGE (0~TOFF_1) | TPCMIN_1 (70 SECONDS) | TPCTYP_1 (100 SECONDS) | TPCMAX_1 (120 SECONDS) |
| SECOND RANGE (TOFF_1~TOFF_2) | TPCMIN_2 (45 SECONDS) | TPCTYP_2 (70 SECONDS) | TPCMAX_2 (90 SECONDS) |
| THIRD RANGE (TOFF_2~TOFF_3) | TPCMIN_3 (20 SECONDS) | TPCTYP_3 (40 SECONDS) | TPCMAX_3 (60 SECONDS) | ns.
LIGHT SOURCE LAMP LIGHTING DEVICE AND METHOD

TECHNICAL FIELD

The present invention relates to a light source lamp lighting device and a light source lamp lighting method and a projector.

BACKGROUND ART

A high-pressure discharge lamp used as a light source for a projector is hot immediately after being extinguished. The pressure on the inside of the lamp is high. In general, the high-pressure discharge lamp does not easily discharge in a high-pressure state. Even if an attempt is made to relight the high-pressure discharge lamp in the high-pressure state immediately after being extinguished, the high-pressure discharge lamp cannot sometimes lit. If a voltage is applied to the high-pressure discharge lamp a plurality of times in order to light the high-pressure discharge lamp in such a state, it is likely that electrodes of the high-pressure discharge lamp will deteriorate.

Examples of a method of preventing failure in relighting the high-pressure discharge lamp include ensuring that an extinguishing period during which the discharge lamp is switched off is sufficiently long such that the internal pressure of the high-pressure discharge lamp decreases and the high-pressure discharge lamp is cooled to temperature suitable for discharge. In this case, if the extinguishing period during which the high pressure discharge lamp is turned off is too long, there will be an increase in the amount of delay until a user can use the projector and a deterioration in the convenience of use.

In order to reduce the extinguishing period during which the high pressure discharge lamp is switched off, a projector is also proposed that includes a cooling mechanism such as a fan or a Peltier element to cool the high-pressure discharge lamp.

A technique for determining a cooling time for causing the cooling mechanism to operate is disclosed in Patent Literature 1. In a projector disclosed in Patent Literature 1, a cooling time set in advance according to an extinguishing time is used. The length of the cooling time is set according to how short is the time required to extinguish the lamp. The longer the amount of time required to extinguish the lamp, the shorter is the cooling time that is set.

CITATION LIST

Patent Literature

Patent Literature 1: Japanese Patent No. 3792641

SUMMARY OF INVENTION

Technical Problem

As explained above, when the high-pressure discharge lamp is lit, it is important that the high-pressure discharge lamp be at temperature suitable for discharge. A cooling time necessary until the high-pressure discharge lamp reaches the temperature suitable for discharge changes according to the state of use of the projector. Therefore, in the projector disclosed in Patent Literature 1, a cooling time set in advance according to an extinguishing period when the high pressure discharge lamp is switched off is used.

However, the temperature suitable for discharge itself is different according to an individual difference among projectors. Therefore, even if the extinguishing period when the high pressure discharge lamp is switched off and the temperature are the same, the cooling time until the high-pressure discharge lamp changes to a state in which the high-pressure discharge lamp can be lit is different for each apparatus. Therefore, in the technique disclosed in Patent Literature 1, the high-pressure discharge lamp is sometimes cooled for a longer time than is necessary depending on an apparatus. A cooling time that is longer than the required minimum cooling time is sometimes needed until the user can use the projector.

An object of the present invention is to provide a light source lamp lighting device and a light source lamp lighting method for cooling a high-pressure discharge lamp with a cooling time suitable for each apparatus taking into account an individual differences among apparatuses.

Solution to Problem

In order to attain the object, a light source lamp lighting device according to the present invention includes:
  a light source lamp;
  cooling means for cooling the light source lamp;
  an extinguishing time measurer that calculates extinguishing time information indicating
  an extinguishing period when said light source lamp was last switched off to a present time;
  a storage that stores lighting performance, which is a history of past successes and failures of lighting the light source lamp, a plurality of cooling times corresponding to an extinguishing time indicated by the extinguishing time information as a cooling time for causing the cooling means to operate, and a first threshold set with respect to the lighting performance; and
  a controller that reads out, in lighting the light source lamp, the lighting performance, the cooling time stored in the storage based on the extinguishing period when the high pressure discharge lamp is switched off calculated by the extinguishing time measurer, and the first threshold and, when a number of successes of lighting indicated by the lighting performance exceeds the first threshold, subtracts a predetermined time from the read-out cooling time to calculate a cooling time value for causing the cooling means to operate.

A projector according to the present invention includes the light source lamp lighting device.

A light source lamp lighting method according to the present invention is a light source lamp lighting method in which cooling means for cooling a light source lamp is used, the light source lamp lighting method includes:
  an extinguishing time measurer calculating extinguishing time information time information indicating an extinguishing period when the light source lamp was last switched off to a present time;
  a storage storing lighting performance, which is a history of past successes and failures of lighting in the past of the light source lamp, a plurality of cooling times corresponding to an extinguishing period when the light source lamp is switched off indicated by the extinguishing time information as a cooling time for causing the cooling means to operate, and a first threshold set with respect to the lighting performance; and
  a controller reading out, in lighting the light source lamp, the lighting performance, the cooling time stored in the storage based on the extinguishing period when the light source lamp is switched off calculated by the extinguishing time measurer, and the first threshold and, when a number of successes of lighting indicated by the lighting performance exceeds the first threshold, subtracting a predetermined time from the read-out cooling time to calculate a cooling time value for causing the cooling means to operate.

Advantageous Effects of Invention

According to the present invention, it is possible to determine, for each apparatus, a cooling time before a high-pressure discharge lamp is relit.

BRIEF DESCRIPTION OF DRAWINGS

FIGS. 2(a) to (e) are diagrams showing examples of variables used for calculating a cooling time.

FIGS. 8(a) to (d) are diagrams showing examples of an initial value, a minimum value, and a maximum value of a cooling time set for each cumulative lighting time.

DESCRIPTION OF EMBODIMENTS

The present invention is explained in detail with reference to the drawings.

First Exemplary Embodiment

Figure 1:
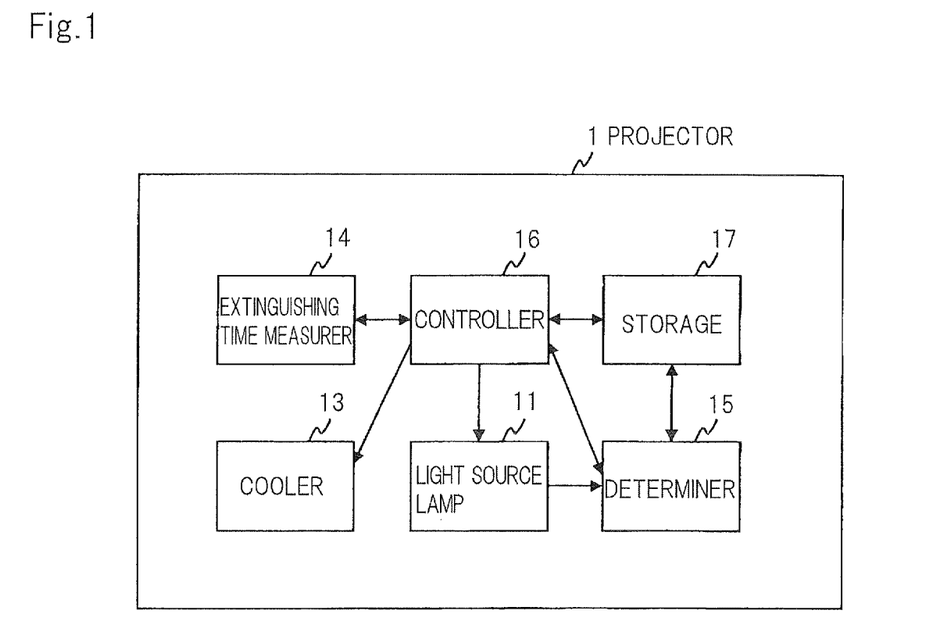
FIG. 1 is a block diagram showing the configuration of a first exemplary embodiment of a projector according to the present invention.

FIG. 1 is a block diagram showing a main part configuration of a first exemplary embodiment of a projector according to the present invention.

Projector 1 according to this exemplary embodiment includes light source lamp 11, cooler 13, extinguishing time measurer 14, determiner 15, controller 16, and storage 17.

Light source lamp 11 functioning as a light source for projecting a video is a high-pressure discharge lamp such as metal halide lamp or a xenon lamp. The lighting state of light source lamp 11 is controlled according to a driving signal input from controller 16.

Cooler 13 is cooling means such as a fan or a Peltier element for cooling light source lamp 11. Cooler 13 cools light source lamp 11 according to a control signal input from controller 16.

Extinguishing time measurer 14 is measuring means such as a timer. Extinguishing time measurer 14 measures an extinguishing period when light source lamp 11 is switched off. Extinguishing time measurer 14 includes a communication function with controller 16. Upon receiving an extinguishing time acquisition request for requesting acquisition of an extinguishing time from controller 16, extinguishing time measurer 14 transmits extinguishing time information indicating the immediately preceding extinguishing time of light source lamp 11 to controller 16.

Extinguishing time measurer 14 performs an operation according to power supplied from a power supply unit of projector 1. When the power supply to the power supply unit of projector 1 stops, extinguishing time measurer 14 receives power supplied from a battery (not shown) built in projector 1 and measures the extinguishing period when light source lamp 11 is switched off.

Determiner 15 is determining means for determining whether lighting of light source lamp 11 is successful. Determiner 15 includes a current detecting circuit (not shown) that measures a current value flowing to light source lamp 11. Determiner 15 measures a current value flowing to light source lamp 11 and, if the measured current value is equal to or larger than a threshold set in advance, determines that the lighting of light source lamp 11 is successful and, if the measured current value is smaller than the threshold, determines that the lighting of light source lamp 11 is unsuccessful.

Upon receiving, from controller 16, a lighting notification indicating that light source lamp 11 is set in a lighting state, determiner 15 determines whether the lighting of light source lamp 11 is successful. Determiner 15 transmits a result notification indicating whether the lighting of light source lamp 11 is successful to controller 16. Controller 16 accumulates the received result notification as lighting performance, which is a history of successes and failures of lighting the light source lamp.

Controller 16 is controlling means for controlling the respective units of projector 1. When lighting light source lamp 11 is lit, controller 16 outputs a predetermined cooling time and a control signal for cooling light source lamp 11 to cooler 13. After causing cooler 13 to cool light source lamp 11, controller 16 lights light source lamp 11.

Variables used for calculating a cooling time are stored in storage 17. Storage 17 is a nonvolatile storage device. The variables stored in storage 17 are retained even if the power supply to projector 1 is stopped.

When determining a cooling time by cooler 13, controller 16 transmits an extinguishing time acquisition request to extinguishing time measurer 14 and acquires extinguishing time information from extinguishing time measurer 14. Thereafter, controller 16 determines a cooling time on the basis of the extinguishing time indicated by the extinguishing time information acquired from extinguishing time measurer 14, lighting performance, which is accumulated past successes or failures of lighting light source lamp 11, and stored contents of storage 17.

After the cooling time determined as explained above, controller 16 lights light source lamp 11. At this point, controller 16 transmits a lighting notification to determiner 15 and causes determiner 15 to determine whether light source lamp 11 has been successfully lit. Thereafter, controller 16 checks the success or failure of the lighting based on a result notification sent from determiner 15 and accumulates the success or failure of the lighting as lighting performance.

Determiner 15 and controller 16 can be realized by, for example, an LSI (Large Scale Integration) including a logic circuit or the like or a CPU (Central Processing Unit) or a DSP (Digital Signal Processor) that operates according to a computer program.

Projector 1 projects video light. Projector 1 includes, besides the respective components explained above, an input unit that receives a video signal and an optical system for projecting video light by the input video signal. The input unit and the optical system are configured using a general technique. Therefore, in FIG. 1, only the components for cooling light source lamp 11 are shown. The input unit and the optical system are not shown and explanation of the input unit and the optical system is omitted.

As explained above, time during which light source lamp 11 should be cooled is differs according to the extinguishing period when light source lamp 11 was last turned off. Therefore, if the cooling time at the time when an extinguishing time is long is determined on the basis of lighting performance at the time when the extinguishing time is short or if the cooling time at the time when an extinguishing time is short is determined on the basis of lighting performance at the time when an extinguishing time is long, the cooling time is likely to be incorrect. Therefore, in this exemplary embodiment, variables for calculating the cooling time are set for each extinguishing period when the light source lamp is switched off and stored in storage 17.

FIG. 2 is a diagram showing stored contents of storage 17. In storage 17, variables used for calculating the cooling time are stored. Numerical values in parentheses shown in FIG. 2 indicate initial values of the respective variables.

In storage 17, five tables 201 to 205 are stored as shown in FIG. 2(a) to FIG. 2(e). The respective tables include the number of successes and the number of failures of lighting included in the lighting performance.

In table 201, first time threshold TOFF_1, second time threshold TOFF_2, and third time threshold TOFF_3 (TOFF_1<TOFF_2<TOFF_3) are described as thresholds for determining the length of the extinguishing period during which light source lamp 11 was last turned off.

In the following explanation, as ranges of the extinguishing period during which light source lamp 11 was last turned off, a range of 0≤extinguishing time<TOFF_1 is referred to as first range, a range of TOFF_1 extinguishing time<TOFF_2 is referred to as second range, and a range of TOFF_2 extinguishing time<TOFF_3 is referred to as third range. In this exemplary embodiment, respective variables shown in tables 201 to 205 are managed for each of the ranges of the extinguishing period when the light source lamp is switched off.

In table 201, cooling time before relighting TCOOL that indicates the time during which light source lamp 11 is cooled when the lighting of light source lamp 11 is unsuccessful and the number of retry times (CRETMAX) that indicates the number of times for retrying a process to relight light source lamp 11 when the lighting of light source lamp 11 is unsuccessful are also described.

In table 202, initial value TPCTYP_n, minimum value TPCMIN_n, and maximum value TPCMAX_n (n=1, 2, and 3) of a cooling time corresponding to the extinguishing period when light source lamp 11 was last switched off are described according to the immediately preceding extinguishing time of light source lamp 11.

As the initial value, the minimum value, and the maximum value of the cooling time, smaller values are used as the extinguishing time becomes longer and larger values are used as the extinguishing time becomes shorter. Consequently, the cooling time is set shorter as the extinguishing time becomes longer, i.e., the temperature of light source lamp 11 is lower. The cooling time is set longer as the temperature of light source lamp 11 becomes higher.

In table 203, reduction time TPCDEC_n indicating time width for reducing the cooling time, reduction condition CNTDEC_n for determining the number of times of continuous success of the lighting of light source lamp 11, extension time TPCINC_n indicating time width for increasing the cooling time, and extension condition CNTINC_n for determining the number of times of continuous failure of the lighting of light source lamp 11 (in all of which, n=1, 2, and 3) are described according to the extinguishing period when light source lamp 11 was last turned off.

The respective variables shown in respective tables 201 to 203 are set in advance and can be reset by a user. However, when the projector is used, the variables are fixed.

In table 204, cooling time value Tpc_n for designating the cooling time of light source lamp 11, success count value Cntok_n for counting the number of times of success in lighting light source lamp 11, and failure count value Cntng_n for counting the number of times of failure in lighting light source lamp 11 (n=1, 2, and 3) are described according to the extinguishing period when light source lamp 11 was last turned off.

Initial values of cooling time values Tpc_1, Tpc_2, and Tpc_3 are respectively TPCTYP_1, TPCTYP_2, and TPCTYP_3. All of initial values of the success count value and the failure count value are 0.

In table 205, minimum cooling time variable Thmin_n indicating a lower limit threshold of the cooling time of light source lamp 11 and maximum cooling time variable Thmax_n indicating an upper limit threshold of the cooling time of light source lamp 11 (n=1, 2, and 3) are described according to the extinguishing period when light source lamp 11 was last turned off.

Initial values of Thmin_1, Thmin_2, and Thmin_3 are respectively TPCMIN_1, TPCMIN_2, and TPCMIN_3. Initial values of Thmax_1, Thmax_2, and Thmax_3 are respectively TPCMAX_1, TPCMAX_2, and TPCMAX_3.

A processing procedure in lighting light source lamp 11 in projector 1 shown in FIG. 1 is explained.

Figure 3:
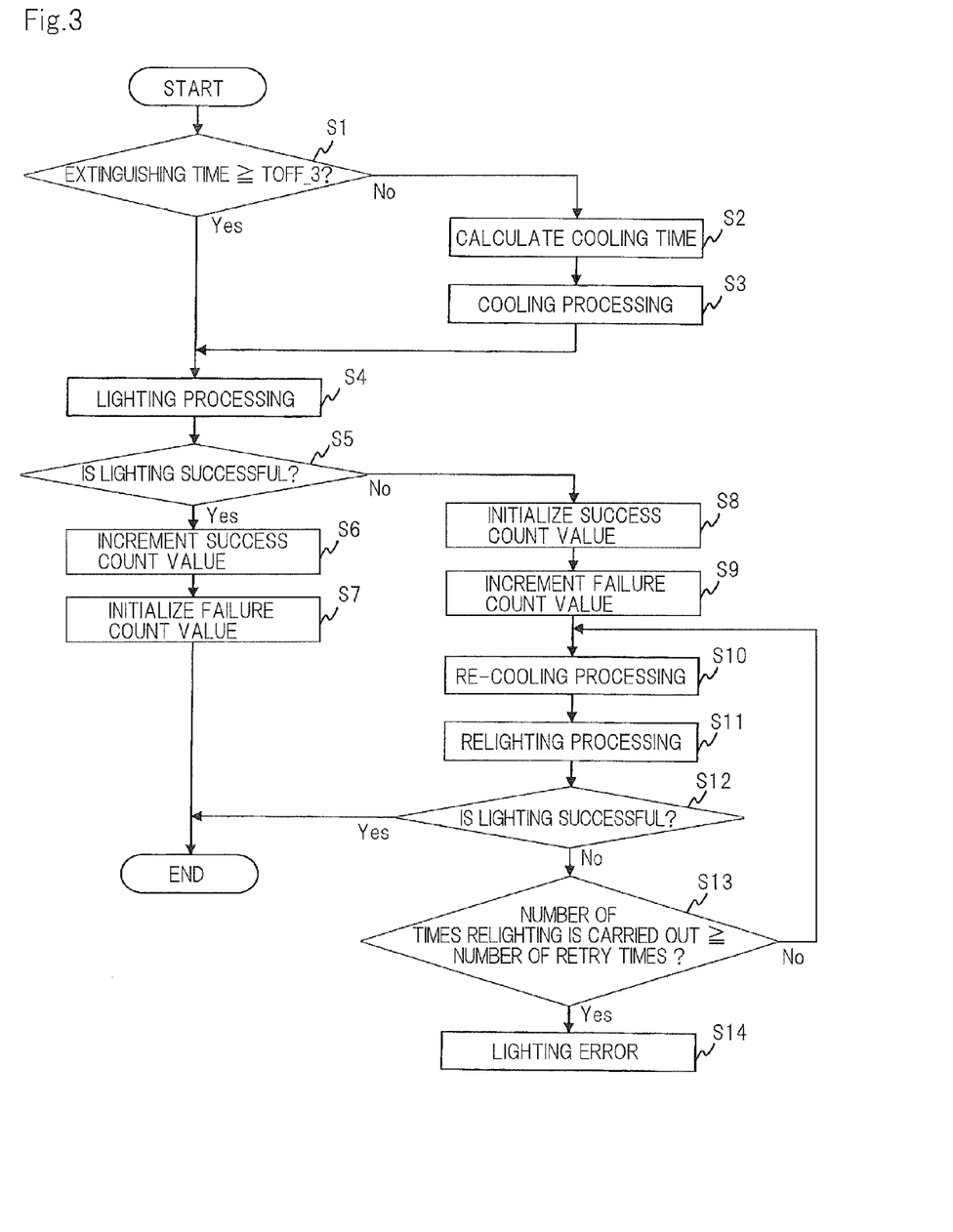
FIG. 3 is a flowchart for explaining a processing procedure in lighting light source lamp 11 in projector 1 shown in FIG. 1.

FIG. 3 is a flowchart for explaining the processing procedure in lighting light source lamp 11 in projector 1 shown in FIG. 1. In the flowchart shown in FIG. 3, it is assumed that light source lamp 11 is off at the start of the processing.

When light source lamp 11 is lit in projector 1, first, controller 16 transmits an extinguishing time acquisition request to extinguishing time measurer 14. Upon receiving the extinguishing time acquisition request, extinguishing time measurer 14 transmits extinguishing time information time information indicating an extinguishing period when light source lamp 11 was last switched off to a present time to controller 16.

Upon receiving the extinguishing time information, controller 16 determines whether the extinguishing period when the light source lamp is switched off indicated by the extinguishing time information is equal to or larger than third time threshold TOFF_3 (step S1).

When the extinguishing period when the light source lamp is switched off is not equal to or larger than third time threshold TOFF_3, controller 16 calculates a cooling time (step S2).

The processing procedure in calculating the cooling time performed in step S2 is explained below.

Figure 4:
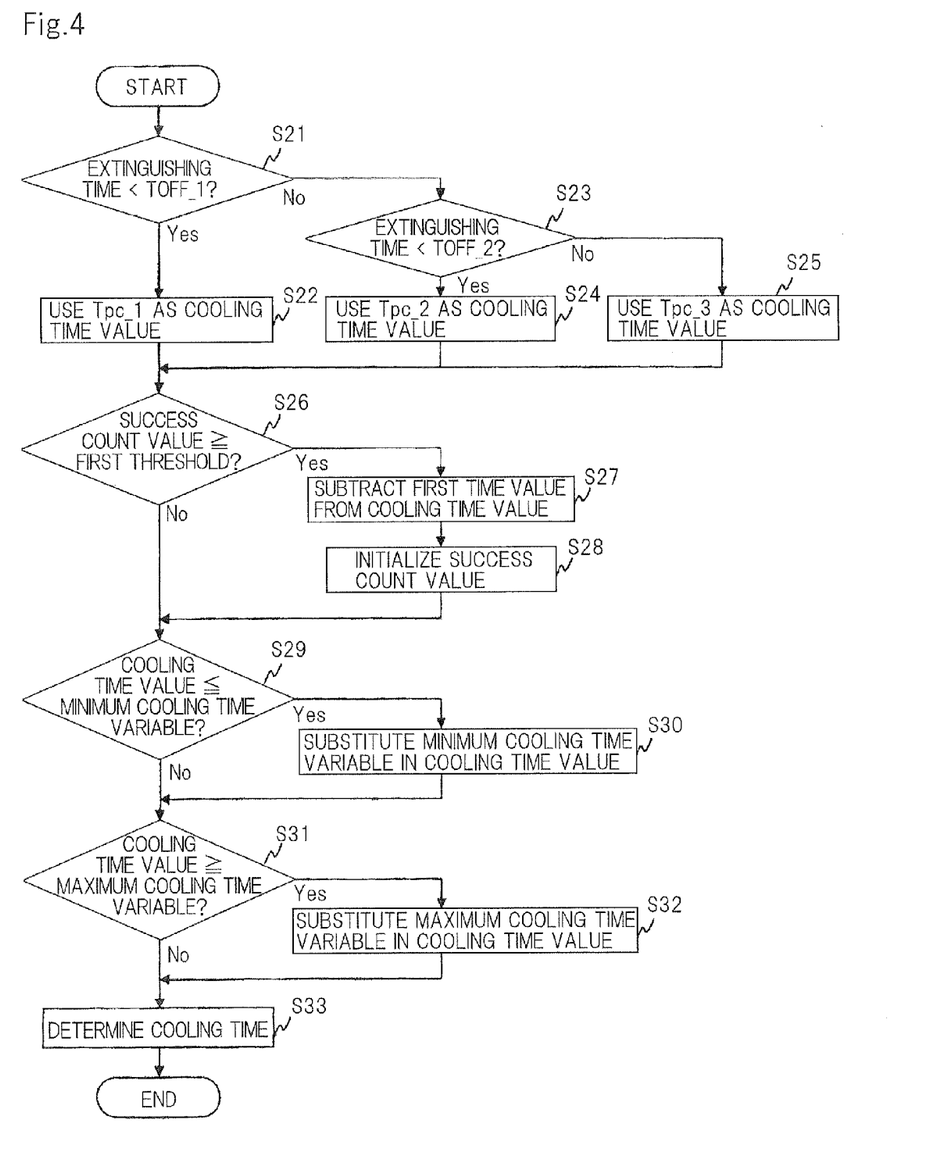
FIG. 4 is a flowchart for explaining a processing procedure in calculating a cooling time in projector 1 shown in FIG. 1.

FIG. 4 is a flowchart for explaining the processing procedure in calculating the cooling time in projector 1 shown in FIG. 1.

As shown in FIG. 4, controller 16 confirms whether an extinguishing period when the light source lamp is switched off is shorter than first time threshold TOFF_1 (step S21). When the extinguishing period when the light source lamp is switched off is shorter than first time threshold TOFF_1, controller 16 uses Tpc_1 as the cooling time value (step S22).

When it is confirmed in step S21 that the extinguishing period when the light source lamp is switched off is not shorter than the first time threshold TOFF_1, controller 16 confirms whether the extinguishing period when the light source lamp is switched off is shorter than second time threshold TOFF_2 (step S23). When the extinguishing period when the light source lamp is switched off is shorter than second time threshold TOFF_2, controller 16 uses Tpc_2 as the cooling time value (step S24).

When it is confirmed in step S23 that the extinguishing period when the light source lamp is switched off is not shorter than second time threshold TOFF_2, controller 16 uses Tpc_3 as the cooling time value (step S25).

In the following processing, controller 16 uses variables associated with the extinguishing period when the light source lamp is switched off. "_n" of the variables shown in the following processing represents "_1" when the extinguishing period when the light source lamp is switched off is within the first range, represents "_2" when the extinguishing period when the light source lamp is switched off is within the second range, and represents "_3" when the extinguishing period when the light source lamp is switched off is within the third range.

When the cooling time value is determined, controller 16 confirms whether success count value Cntok_n is equal to or larger than reduction condition CNTDEC_n (step S26).

When it is confirmed that success count value Cntok_n is equal to or larger than reduction condition CNTDEC_n, controller 16 subtracts reduction time TPCDEC_n from cooling time value Tpc_n (step S27), initializes success count value Cntok_n to 0 (step S28), and shifts to step S29.

When it is confirmed in step S26 that success count value Cntok_n is not equal to or larger than reduction condition CNTDEC_n, controller 16 shifts to step S29.

In step S29, controller 16 confirms whether cooling time value Tpc_n is equal to or smaller than minimum cooling time variable Thmin_n (step S29).

When it is confirmed that cooling time value Tpc_n is equal to or smaller than minimum cooling time variable Thmin_n, controller 16 substitutes minimum cooling time variable Thmin_n in cooling time value Tpc_n (step S30) and shifts to step S31.

When it is confirmed in step S29 that cooling time value Tpc_n is not equal to or smaller than minimum cooling time variable Thmin_n, controller 16 shifts to step S31.

In step S31, controller 16 determines whether cooling time value Tpc_n is equal to or larger than maximum cooling time variable Thmax_n (step S31).

When cooling time value Tpc_n is equal to or larger than maximum cooling time variable Thmax_n, controller 16 substitutes maximum cooling time variable Thmax_n in cooling time value Tpc_n (step S32) and shifts to step S33.

When it is confirmed in step S31 that cooling time value Tpc_n is not equal to or larger than maximum cooling time variable Thmax_n, controller 16 shifts to step S33.

In step S33, controller 16 determines cooling time value Tpc_n as a cooling time of this time.

Referring back to FIG. 3, a processing procedure in lighting light source lamp 11 is explained from step S3.

Controller 16 continues to output a control signal for cooling light source lamp 11 to cooler 13 for the cooling time determined in step S33. When the control signal is input from controller 16, cooler 13 cools light source lamp 11 while the control signal is input (step S3). When the cooling time elapses, controller 16 stops the output of the control signal and shifts to step S4. When it is confirmed in step S1 that the extinguishing period when the light source lamp is switched off is equal to or larger than third time threshold TOFF_3, controller 16 shifts to step S4.

In step S4, controller 16 outputs a driving signal for lighting photoelectric lamp 11 (step S4).

After outputting the driving signal to photoelectric lamp 11, controller 16 transmits a lighting notification to determiner 15. Determiner 15 receives the lighting notification from controller 16 and confirms whether the lighting of light source lamp 11 is successful (step S5).

Upon confirming that the lighting of light source lamp 11 is successful, determiner 15 transmits a result notification indicating success or failure of the lighting of light source lamp 11 to controller 16.

Upon receiving the result notification indicating that the lighting of light source lamp 11 is successful from determiner 15, controller 16 increments success count value Cntok_n (step S6) and initializes failure count value Cntng_n to 0 (step S7).

Thereafter, controller 16 transmits an extinguishing time measurement end request for ending the measurement of the extinguishing period when the light source lamp is switched off to extinguishing time measurer 14. Upon receiving the extinguishing time measurement end request from controller 16, extinguishing time measurer 14 ends the measurement of the extinguishing period when the light source lamp is switched off and transmits an extinguishing time measurement end response indicating that the measurement of the extinguishing period when the light source lamp is switched off has ended to controller 16. Upon receiving the extinguishing time measurement end response from extinguishing time measurer 14, controller 16 ends the process for lighting light source lamp 11.

When the result notification from determiner 15 indicates that the lighting of light source lamp 11 is unsuccessful, controller 16 initializes success count value Cntok_n to 0 (step S8) and increments failure count value Cntng_n (step S9).

After step S9, controller 16 continues to output a control signal for cooling light source lamp 11 to cooler 13 for the time indicated by cooling time before relighting TCOOL. Cooler 13 cools light source lamp 11 while the control signal is input from controller 16 (step S10).

When the cooling time before relighting elapses, controller 16 stops the output of the control signal and outputs a driving signal for lighting light source lamp 11 to light source lamp 11 (step S11).

Controller 16 transmits a lighting notification to determiner 15 after outputting the driving signal to light source lamp 11. Upon receiving the lighting notification from controller 16, determiner 15 confirms whether the lighting of light source lamp 11 is successful (step S12) and transmits a result notification indicating success or failure of the lighting of light source lamp 11 to controller 16.

Upon receiving the result notification indicating that the lighting of light source lamp 11 is successful from determiner 15, controller 16 transmits an extinguishing time measurement end request to extinguishing time measurer 14. Upon receiving the extinguishing time measurement end request, extinguishing time measurer 14 ends the measurement of the extinguishing period when the light source lamp is switched off and transmits an extinguishing time measurement end response to controller 16. Upon receiving the extinguishing time measurement end response, controller 16 ends the process for lighting light source lamp 11.

On the other hand, upon determining that the relighting of light source lamp 11 is unsuccessful, determiner 15 transmits a result notification indicating that the lighting of light source lamp 11 is unsuccessful to controller 16.

When the result notification from determiner 15 indicates that the lighting of light source lamp 11 is unsuccessful, controller 16 confirms whether the process for relighting light source lamp 11 has been carried out for the number of retry times (CRETMAX) or more (step S13).

When it is confirmed in step S13 that the process for relighting light source lamp 11 has not been executed for the number of retry times (CRETMAX) or more, controller 16 returns to step S10 and repeats the processing in steps S10 to S13 until the process for relighting light source lamp 11 has been carried out for the number of retry (CRETMAX) times or more.

When it is confirmed in step S13 that the process for relighting light source lamp 11 has been carried out for the number of retry times (CRETMAX) or more, controller 16 determines that a lighting error has occurred and ends the process for lighting source lamp 11 (step S14).

A processing procedure for extinguishing light source lamp 11 in projector 1 shown in FIG. 1 is explained.

Figure 5:
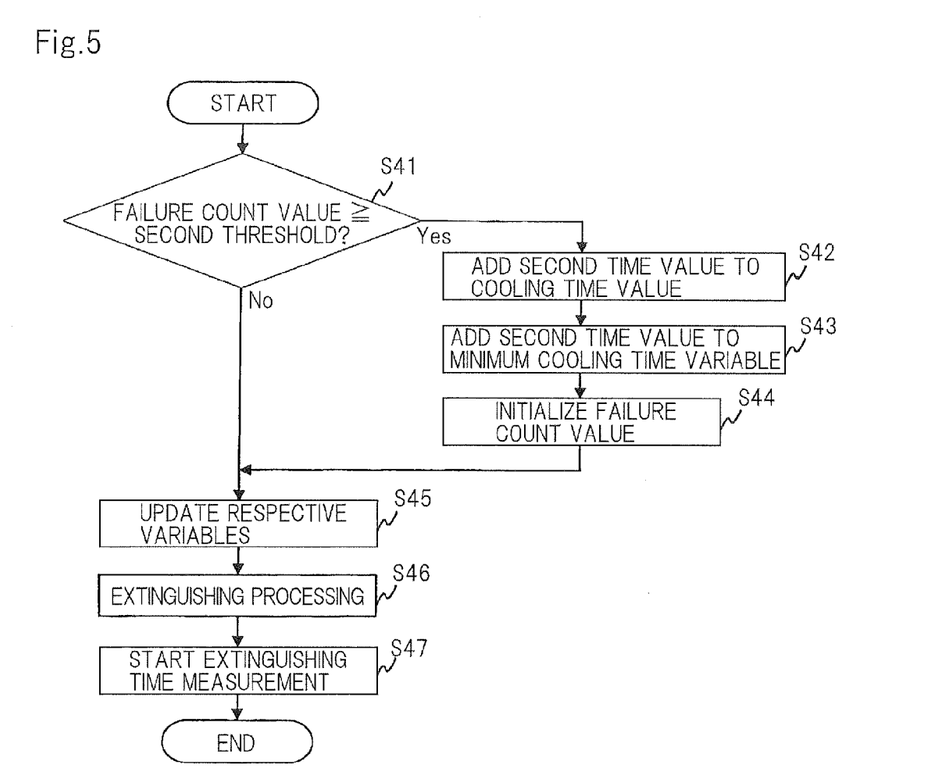
FIG. 5 is a flowchart for explaining a processing procedure in extinguishing light source lamp 11 in projector 1 shown in FIG. 1.

FIG. 5 is a flowchart for explaining the processing procedure for extinguishing light source lamp 11 in projector 1 shown in FIG. 1.

When extinguishing light source lamp 11, first, controller 16 confirms whether failure count value Cntng_n is equal to or larger than extension condition CNTINC_n (step S41).

When it is confirmed in step S41 that failure count value Cntng_n is equal to or larger than extension condition CNTINC_n, controller 16 adds extension time TPCINC_n to cooling time value Tpc_n (step S42) and adds extension time TPCINC_n to minimum cooling time variable Thmin_n as well (step S43). This is to prevent the cooling time from becoming too short in the following processing since it is likely that the cooling time is too short.

Subsequently, controller 16 initializes failure count value Cntng_n to 0 (step S44) and shifts to step S45.

When it is confirmed in step S41 that failure count value Cntng_n is not equal to or larger than extension condition CNTINC_n, controller 16 shifts to step S45.

In step S45, controller 16 updates the respective variables stored in storage 17.

After updating the respective variables, controller 16 stops the output of the driving signal to light source lamp 11 and extinguishes light source lamp 11 (step S46). Controller 16 transmits an extinguishing time measurement start request for starting measurement of the extinguishing period when the light source lamp is switched off to extinguishing time measurer 14.

Upon receiving the extinguishing time measurement start request, extinguishing time measurer 14 starts the measurement of the extinguishing period when the light source lamp is switched off (step S47) and transmits an extinguishing time measurement start response indicating that the measurement of the extinguishing period when the light source lamp is switched off has been started to controller 16. Controller 16 ends the extinguishing processing for light source lamp 11 upon receipt of the extinguishing time measurement start response.

In an example explained in this exemplary embodiment, the variables for calculating the cooling time are managed for each extinguishing period during which light source lamp 11 has been turned off.

Figure 6:
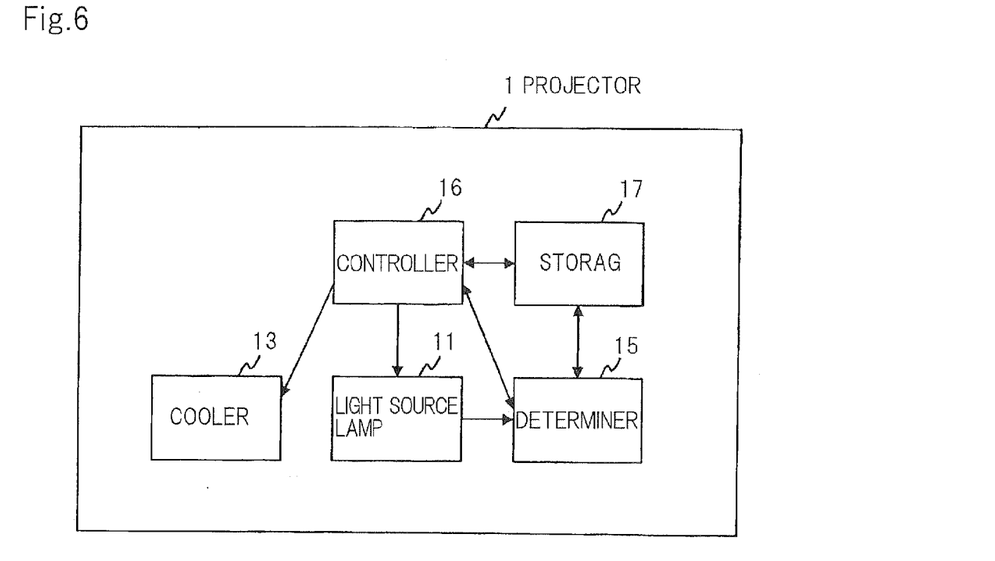
FIG. 6 is a block diagram showing a configuration example of projector 1 in which extinguishing time measurer 14 is omitted.

As the variables for calculating the cooling time, three kinds of cooling time values Tpc_1 corresponding to the extinguishing period when light source lamp 11 is switched off are used. However, a configuration in which constants unrelated to the extinguishing period when the light source lamp is switched off are used may be adopted. In that case, in projector 1, it is unnecessary to measure the extinguishing period when the light source lamp is switched off. FIG. 6 is a diagram showing the configuration of such projector 1. As shown in the figure, projector 1 has a simplified configuration in which extinguishing time measurer 14 is omitted. The flowchart shown in FIG. 4 is started from step S26. Such a form is also included in the present invention.

A configuration may be adopted in which a temperature detector that measures the temperature of light source lamp 11 is provided in projector.

The variables for calculating the cooling time may be variables corresponding to the temperature of light source lamp 11. Controller 16 may calculate, before lighting light source lamp 11, the cooling time by using the variables corresponding to the temperature of light source lamp 11.

In an example shown in FIG. 2(c), the same values are used as a reduction condition, an extension condition, a reduction time, and an extension time irrespective of the extinguishing period when the light source lamp is switched off. However, different values may be used as the reduction condition, the extension condition, the reduction time, and the extension time based on the extinguishing period when the light source lamp is switched off.

As explained above, according to this exemplary embodiment, upon receiving the lighting notification from controller 16, determiner 15 determines whether the lighting of light source lamp 11 is successful and transmits a result notification to controller 16. On the other hand, upon receiving the result notification from determiner 15, controller 16 increments the success count value when the lighting of light source lamp 11 is successful and initializes the success count value to 0 when the lighting of light source lamp 11 is unsuccessful. When the success count value is equal to or larger than the reduction condition, controller 16 subtracts the reduction time from the cooling time value and sets, as the cooling time, the cooling time value from which the reduction time has been subtracted.

Consequently, projector 1 can reduce the cooling time according to lighting performance of light source lamp 11 included in its own apparatus. Therefore, it is possible to determine, for each apparatus, the cooling time of the high-pressure discharge lamp before the high-pressure discharge lamp is relit. In the projector including the high-pressure discharge lamp that is easily lit even at high temperature, it is possible to reduce the cooling time before relighting the high-pressure discharge lamp.

Controller 16 in this exemplary embodiment increments the failure count value when the lighting of light source lamp 11 is unsuccessful and initializes the failure count value to 0 when the lighting of light source lamp 11 is successful. When the failure count value is equal to or larger than the extension condition, controller 16 adds the extension time to the cooling time value and sets, as the cooling time, the cooling time value to which the extension time is added.

Consequently, when the cooling time of light source lamp 11 is too short, projector 1 can increase the cooling time again. Therefore, it is impossible to prevent failure to light source lamp 11 and to prevent deterioration of the electrodes of light source lamp 11.

Second Exemplary Embodiment

Figure 7:
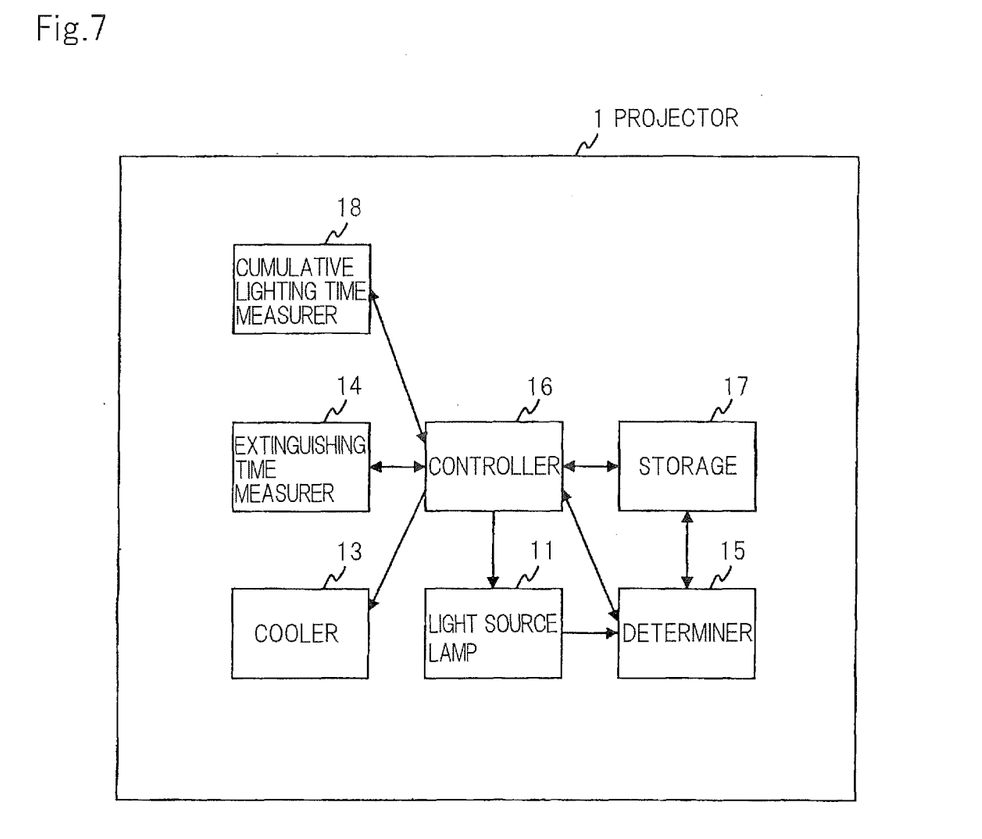
FIG. 7 is a block diagram showing the configuration of a second exemplary embodiment of the projector according to the present invention.

FIG. 7 is a block diagram showing the configuration of a second exemplary embodiment of the projector according to the present invention.

In the first exemplary embodiment, the respective variables for calculating the cooling time are managed based on the extinguishing period when light source lamp 11 is switched off. On the other hand, in this exemplary embodiment, the respective variables for calculating the cooling time are managed based on a cumulative lighting time to the present of light source lamp 11.

As shown in FIG. 7, projector 1 according to the second exemplary embodiment includes cumulative lighting time measurer 18 in addition to the components of projector 1 according to the first exemplary embodiment.

Cumulative lighting time measurer 18 is a measuring means such as a timer. Cumulative lighting time measurer 18 measures a cumulative lighting time to the present. Cumulative lighting time measurer 18 includes a communication function with controller 16. Upon receiving a cumulative lighting time acquisition request for requesting acquisition of the cumulative lighting time from controller 16, cumulative lighting time measurer 18 transmits cumulative lighting time information indicating the cumulative lighting time to controller 16.

In storage 17 in this exemplary embodiment, an initial value, a minimum value, and a maximum value of a cooling time set in advance are stored in association with the cumulative lighting time. Controller 16 transmits the cumulative lighting time acquisition request to cumulative lighting time measurer 18 to thereby acquire the cumulative lighting time information from cumulative lighting time measurer 18. Controller 16 calculates the cooling time using the initial value, the minimum value, and the maximum value of the cooling time associated with the cumulative lighting time indicated by the acquired cumulative lighting time information.

Upon receiving a result notification indicating that the lighting of light source lamp 11 is successful from determiner 15, controller 16 transmits a measurement start request for starting measurement of time to cumulative lighting time measurer 18. Further, upon stopping the output of a driving signal to light source lamp 11, controller 16 transmits a measurement end request for ending the measurement of time to cumulative lighting time measurer 18. On the other hand, cumulative lighting time measurer 18 measures time from the reception of the measurement start request to the reception of the measurement end request and adds the measured time to the cumulative lighting time to the present.

Examples of the initial value, the minimum value, and the maximum value of the cooling time set for each cumulative lighting time are shown in FIGS. 8(*a*) to (*d*).

As shown in FIG. 8, in storage 17, initial value TPCTYP_n, minimum value TPCMIN_n, and maximum value TPCMAX_n (n=1, 2, and 3) of the cooling time are stored in association with the cumulative lighting time and an extinguishing period when the light source lamp is switched off.

In the example shown in FIG. 8, as the initial value, the minimum value, and the maximum value of the cooling time, larger values are respectively used since the cumulative lighting time is longer and smaller values are respectively used since the cumulative lighting time is shorter. Consequently, it is possible to set the cooling time longer since the cumulative lighting time is longer and set the cooling time shorter since the cumulative lighting time is shorter.

In an example explained in this exemplary embodiment, the initial value, the minimum value, and the maximum value of the cooling time are set for each cumulative lighting time. However, for example, a reduction condition, a reduction time, an extension condition, or an extension time may also be set for each cumulative lighting time. A cooling time value, a success count value, a failure count value, a minimum cooling time variable, or a maximum cooling time variable may be managed for each cumulative lighting time.

As explained above, in storage 17 in this exemplary embodiment, the initial value of the cooling time set in advance is stored in association with the cumulative lighting time. Controller 16 calculates the cooling time using the initial value of the cooling time associated with the cumulative lighting time indicated by the cumulative lighting time information acquired from cumulative lighting time measurer 18.

Consequently, in projector 1, it is possible to set an appropriate value corresponding to the cumulative lighting time of light source lamp 11 to the present as the initial value of the cooling time. It is possible to calculate cooling times suitable for respective light source lamps by determining a smaller number of times for lighting the light source lamp.

The present invention is explained above with reference to the exemplary embodiments. However, the present invention is not limited to the exemplary embodiments. Various modifications understandable by those skilled in the art can be made to the configuration and details of the present invention within the scope of the present invention.

REFERENCE SIGNS LIST

1 projector
11 light source lamp
13 cooler
14 extinguishing time measurer
15 determiner
16 controller
17 storage
18 cumulative lighting time measurer

The invention claimed is:

1. A light source lamp lighting device comprising:
a light source lamp;
cooling means for cooling said light source lamp;
an extinguishing time measurer that calculates extinguishing time information indicating an extinguishing period when said light source lamp was last switched off to a present time;
a storage that stores lighting performance, which is a history of past successes and failures of lighting said light source lamp, a plurality of cooling times corresponding to an extinguishing period when the light source lamp is switched off indicated by the extinguishing time information as a cooling time for causing said cooling means to operate, and a first threshold set with respect to the lighting performance; and
a controller that reads out, in lighting said light source lamp, the lighting performance, the cooling time stored in said storage based on the extinguishing period when the light source lamp is switched off calculated by said extinguishing time measurer, and the first threshold and, when a number of successes of lighting indicated by the lighting performance exceeds the first threshold, subtracts a predetermined time from the read-out cooling time to calculate a cooling time value for causing said cooling means to operate.

2. The light source lamp lighting device according to claim 1, wherein
said storage stores a second threshold set with respect to the lighting performance, and
said controller reads out the second threshold, as well, in lighting said light source lamp and, when the number of successes of the lighting indicated by the lighting performance does not exceed the first threshold and a number of failures of the lighting exceeds the second threshold, adds a predetermined time to the read-out cooling time to obtain a cooling time value for causing said cooling means to operate.

3. The light source lamp lighting device according to claim 1, further comprising a cumulative lighting time measurer that measures a cumulative lighting time to the present of said light source lamp, wherein
- in said storage, a plurality of tables, in which a plurality of cooling times corresponding to the extinguishing period when the light source lamp is switched off indicated by the extinguishing time information as the cooling time for causing said cooling means to operate are described, are stored according to the cumulative lighting time, and
- in lighting said light source lamp, said controller calculates the cooling time value using the cooling time stored in the storage according to the lighting performance and the cumulative lighting time.

4. The light source lamp lighting device according to claim 2, further comprising a cumulative lighting time measurer that measures a cumulative lighting time to the present of said light source lamp, wherein
- in said storage, a plurality of tables, in which a plurality of cooling times corresponding to the extinguishing period when the light source lamp is switched off indicated by the extinguishing time information as the cooling time for causing said cooling means to operate are described, are stored according to the cumulative lighting time, and
- in lighting said light source lamp, said controller calculates the cooling time value using the cooling time stored in the storage according to the lighting performance and the cumulative lighting time.

5. A projector comprising the light source lamp lighting device according to claim 1.

6. A projector comprising the light source lamp lighting device according to claim 2.

7. A projector comprising the light source lamp lighting device according to claim 3.

8. A projector comprising the light source lamp lighting device according to claim 4.

9. A light source lamp lighting method in which cooling means for cooling a light source lamp is used, the light source lamp lighting method comprising:
- an extinguishing time measurer calculating extinguishing time information indicating an extinguishing period when said light source lamp was last switched off to a present time;
- a storage storing lighting performance, which is a history of past successes and failures of lighting the light source lamp, a plurality of cooling times corresponding to an extinguishing period when the light source lamp is switched off indicated by the extinguishing time information as a cooling time for causing the cooling means to operate, and a first threshold set with respect to the lighting performance; and
- a controller reading out, in lighting the light source lamp, the lighting performance, the cooling time stored in the storage based on the extinguishing period when the light source lamp is switched off calculated by the extinguishing time measurer, and the first threshold and, when a number of successes of lighting indicated by the lighting performance exceeds the first threshold, subtracting a predetermined time from the read-out cooling time to calculate a cooling time value for causing the cooling means to operate.

10. The light source lamp lighting method according to claim 9, wherein
- the storage stores a second threshold set with respect to the lighting performance, and
- the controller reads out the second threshold as well in lighting the light source lamp and, when the number of successes of the lighting indicated by the lighting performance does not exceed the first threshold and a number of failures of the lighting exceeds the second threshold, adds a predetermined time to the read-out cooling time to obtain a cooling time value for causing the cooling means to operate.

11. The light source lamp lighting method according to claim 9, wherein
- a cumulative lighting time measurer measures a cumulative lighting time to a present of the light source lamp,
- the storage stores, according to the cumulative lighting time, a plurality of tables in which a plurality of cooling times corresponding to the extinguishing period when the light source lamp is switched off indicated by the extinguishing time information as the cooling time for causing the cooling means to operate are described, and
- in lighting the light source lamp, the controller calculates the cooling time value using the cooling time stored in the storage according to the lighting performance and the cumulative lighting time.

12. The light source lamp lighting method according to claim 10, wherein
- a cumulative lighting time measurer measures a cumulative lighting time to a present of the light source lamp,
- the storage stores, according to the cumulative lighting time, a plurality of tables in which a plurality of cooling times corresponding to the extinguishing period when the light source lamp is switched off indicated by the extinguishing time information as the cooling time for causing the cooling means to operate are described, and
- in lighting the light source lamp, the controller calculates the cooling time value using the cooling time stored in the storage according to the lighting performance and the cumulative lighting time.

* * * * *